Aug. 7, 1928.

A. M. JOHNSON 1,679,529

AUTOMATIC MACHINE TOOL

Filed March 8, 1923　　5 Sheets-Sheet 1

Fig. 1

Inventor
Albert M. Johnson

Aug. 7, 1928.  1,679,529
A. M. JOHNSON
AUTOMATIC MACHINE TOOL
Filed March 8, 1923   5 Sheets-Sheet 4

Inventor
Albert M. Johnson
By Chindahl, Parker & Carlson
Attys

Patented Aug. 7, 1928.

1,679,529

UNITED STATES PATENT OFFICE.

ALBERT M. JOHNSON, OF ROCKFORD, ILLINOIS, ASSIGNOR TO BARNES DRILL CO., OF ROCKFORD, ILLINOIS, A CORPORATION OF ILLINOIS.

AUTOMATIC MACHINE TOOL.

Application filed March 8, 1923. Serial No. 623,631.

The invention pertains to a machine tool embodying a spindle reciprocable to carry a cutting tool into and out of operative association with pieces of work successively presented to the tool; and it has particular reference to a control mechanism for the spindle-carrying tool and the work-presenting means whereby properly to synchronize their movements and effect the rapid and efficient operation of the machine.

An important object of the invention is to produce a controlling mechanism embodying a rotary element which is adapted to be actuated periodically or intermittently through a positive connection with a source of power.

In the accompanying drawings I have illustrated a machine which is particularly adapted for use in forming the internal thread of a nut or similar piece of work, and embodying therefore a construction such that the tap is rotated in one direction as it is being fed to the work, and then is instantly reversed at a predetermined point for return to its initial position. It is to be understood, however, that the invention is not limited to a construction in which the direction of rotation of the spindle is reversed, for it may be used with equal advantage in controlling the spindle feed in one direction only as when the operation to be performed is that of drilling or forming external screw threads upon a part as set forth in my copending application Serial No. 623,632, filing date March 8, 1923. It is also contemplated that various other changes in the form, construction and arrangement of the parts may be made by those skilled in the art without departing from the spirit and scope of the invention as expressed in the appended claims.

Fig. 6ª is a fragmentary horizontal sectional view showing a detail of construction.

Fig. 9ª is a similar view with parts broken away to show details of construction.

The machine in which I have embodied my invention is generally of a type well known in the art of drilling machines. Thus it comprises a main support or column 15 the upper end of which is extended forwardly to form a head or bearing 16 in which is mounted for vertical sliding movement a sleeve 17. The latter in turn has a spindle 18 journaled therein which carries at its lower end a tool shank 18ª equipped with a tap 18ᵇ. The sleeve has a splined connection with the bearing 16 so as to be non-rotatable, and has fixed thereto a rack 19 with which a pinion 20 of a feed mechanism 21 is adapted to mesh.

The spindle 18 has splined upon its upper end a bevel gear 22 meshing with a pinion 23 upon the upper end of an inclined shaft 24 which forms part of a change speed transmission indicated generally by the numeral 25. This mechanism also embodies a parallel shaft 26, and the whole is enclosed within a housing 27. Power is transmitted from a suitable source (not shown) to a pulley 28 (Fig. 2) fast upon a shaft 29 carrying a miter gear 30 and a bevel gear 31. These gears are normally loose upon the shaft 29. The lower end of the shaft 26 of the change speed transmission has fast thereon a miter gear 32 and a bevel pinion 32ª (Fig. 1) which are adapted to mesh respectively with the gears 30—31 under the control of a friction clutch 33 mounted on the shaft 29 between the gears 30—31.

The feed mechanism 21 (Fig. 1) is arranged to be driven from the shaft 25 of the change speed transmission through a worm 34 meshing with a worm gear 35 which is rigid with a spur gear 36. The latter is connected through a gear train 37—38 with a horizontal shaft 40 having fast thereon a spur gear 41 which meshes with a spur gear 42 rigid with a cross feed spindle 44 carrying the pinion 20. The gears 37—38 and 41 are mounted on a bracket 43 pivoted upon the axis of the gear 36 and swingable by means of a lever 46 to carry the gear 41 into and out of mesh with the gear 42.

It will be observed that the gears 30—31 and 32—32ª being of varying size, the speed of rotation of the spindle will vary depending upon the position of the clutch 33; and since the feed mechanism is at all times operatively associated with the means for rotating the spindle, the rate of travel of the spindle also varies. The arrangement is such that the spindle travels forwardly at a slower speed and returns at a higher speed.

Referring now to Figs. 5 to 9, 13 and 14, a circular table or turret 47 is preferably employed to carry the work, herein shown in the form of nut blanks a. This turret is mounted for rotation with a step by step movement to present the blanks a successively to the cutting tool or tools, as the case may be. Herein the turret is shown as having a rigid depending ring 48 whose periphery is grooved to receive an inturned annular flange or way 49ª. This way is formed on a supporting frame 49 mounted upon a stationary table 50, and beneath the latter is a chip pan 51, the whole being mounted upon a support 52 adjustable vertically on the column 15. A central bearing sleeve or hub 52ª rigid with the depending ring 48 receives a stud 52ᵇ securely fastened in the stationary table 50.

Figures 5, 6, 6A, 7, 8:
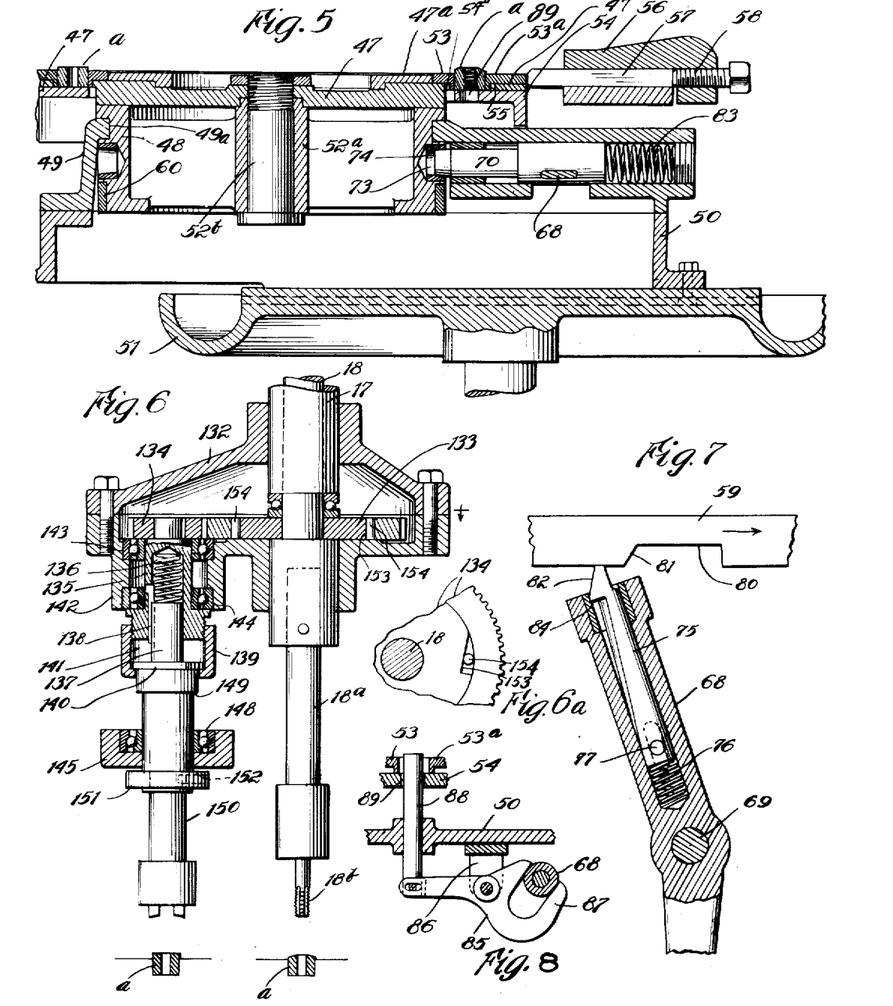
Fig. 5 is a fragmentary vertical sectional view illustrating details of construction of the table or turret in which the work is mounted for presentation to the tool.
Fig. 6 is a fragmentary vertical sectional view illustrating the relation of the facing and thread cutting means.
Fig. 7 is a fragmentary plan view partially in section, illustrating a portion of the work-ejector and table locking mechanism.
Fig. 8 is a fragmentary vertical sectional view illustrating another portion of this mechanism.
Figure 9:
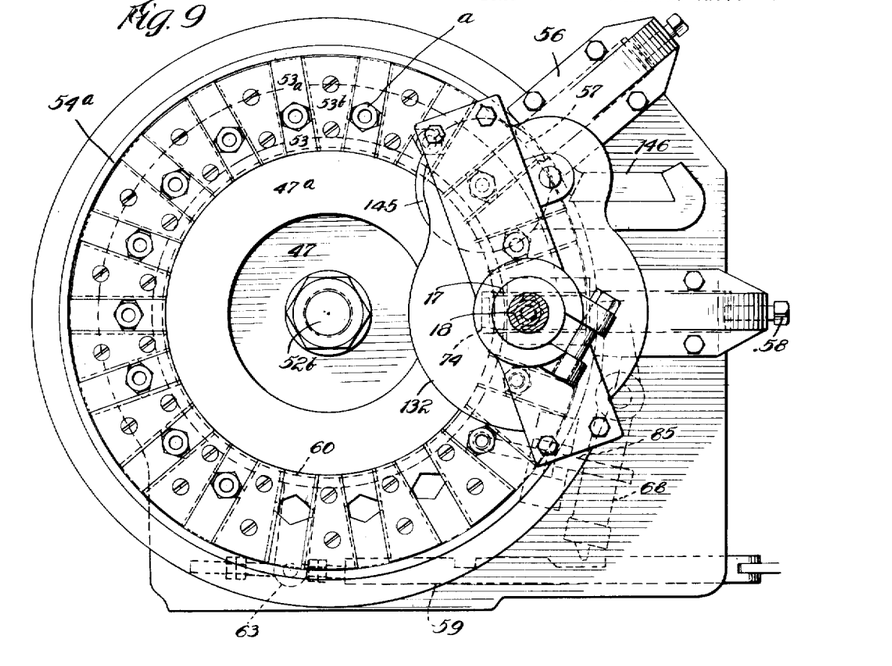
Fig. 9 is a horizontal sectional view taken approximately in the plane of line 9 of Fig. 1.
Figure 9A:
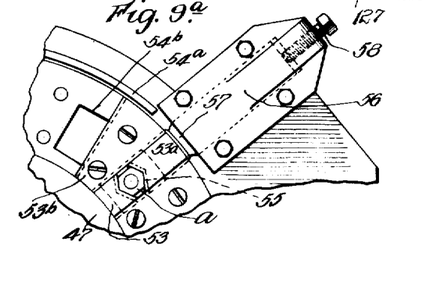

For holding the blanks in position while being operated upon, I provide a pair of clamping jaws 53 and 53ª mounted for sliding movement in radial grooves formed on the upper face of the turret, and between plates 53ᵇ (Fig. 9). The inner ends of the jaws 53 normally abut the outer periphery of a ring 47ª rigid with the turret 47; and the outer ends of the jaws 53ª normally engage an annular rim or flange 54ª (Fig. 9) rigid with a slide plate 54 (Fig. 5) which is supported above the stationary table 50. In Fig. 5 the rim 54ª is not shown being cut away upon the rear side of the table to render the jaws accessible by the cam 57 to be presently described. Near its outer edge the turret is provided with apertures 54ᵇ to receive depending dogs 55 upon the adjacent ends of the jaws 53 and 53ª which are adapted to engage with the blank; and these dogs 55 further serve to limit the sliding movement of the jaws.

A bracket 56 stationarily supported at the inner or rear side of the table carries a cam member 57, the forward end of which operatively engages with the outer ends of the jaws 53ª as the latter in their rotation pass below the cutting tool. This cam member is adjusted by means of a screw 58 so that when a blank is inserted between the jaws 53 and 53ª the passage of the latter into engagement with the cam member will effect a firm gripping of the blank so as to hold it in place upon the table for the screw threading or other operation. I have herein shown two cam members mounted in brackets 56, one beneath the facing tool and the other beneath the tap or other thread cutting tool.

The turret is rotated with a step-by-step motion through the operation of the reciprocatory rod 59 actuated by the controlling mechanism in a manner to be hereinafter set forth. This rod 59 is slidably mounted upon the underside of the stationary table 50 and is connected with a band 60 encircling the depending ring 48 of the turret through the medium of a screw-threaded rod 61 having a collar 62 thereon pivoted upon an arm 63 extending radially from the band 60. Stops 64 and 65 are arranged in spaced relation upon the rod 61 so as to limit the movements of the collar 62 in either direction thereon.

In the periphery of the depending ring 48 of the turret there are formed a plurality of recesses 66 having inclined bottoms and containing rollers 67 of a size such that when the band is rotated in one direction, the rollers will wedge between it and the outwardly inclined bottom of the recess thus locking the band and table together. The arrangement is such that as the rod 59 is reciprocated, the one-way clutch device formed by the rollers 67 in the recesses 66, moves the table a distance equal to the distance between any two adjacent blanks a upon the table.

Associated with this means for rotating the turntable I provide a locking mechanism adapted to hold it against rotation while the cutting operation or operations are being performed and to release it upon the withdrawal of the tool for movement to present the next adjacent blanks to their respective tools. This means in the present instance comprises a lever 68 pivoted at 69 upon the underside of the stationary table 50. One end of this lever is pivotally connected with a plunger 70 slidable in bearings 71, 72 also formed upon the underside of the table 50 the inner end of the plunger being shaped to enter holes 73 formed in the periphery of the ring 48 of the turntable and preferably provided with bushings 74 (Fig. 5). The other end of the lever 68 has slidable longitudinally therein a finger 75 (Fig. 7) normally projecting forwardly from the lever through the action of a coiled expansion spring 76. Outward movement of the finger 75 is limited by a pin 77 operating in a slot 78 in the inner end of the finger.

The bar 59 is provided with a pair of notches 79 and 80. The outer one of these notches, 80, has its innermost wall inclined as at 81, and when the rod is in its foremost or initial position, before its movement to effect a rotation of the table, the finger lies within this notch. As the rod moves rearwardly the bevelled end 81 of the notch 80 engages with a correspondingly bevelled surface 82 of the finger 75, forcing the finger inwardly into the lever 68 against the action of the spring 76 (see Fig. 7). In this movement of the rod, the band 60 remains stationary by reason of the lost motion connection between it and the rod afforded by the spacing of the stops 64—65, the turntable being locked in this position of the parts by the plunger 70 which is held in its innermost position by a coiled compression spring 83 in the outer bearing 71 for the plunger. As the notch 79 moves into position to receive the finger 75, the latter is forced outwardly by the action of its spring. The bar now is moved forwardly and the finger is engaged to swing the lever 68 to free the table. The finger, it will be observed, (Fig. 7), is notched or cut away at its forward side to form a shoulder 84, and in this movement of the bar 59, the shoulder engages with the free end of the lever 68 (Fig. 14) so as to hold the finger in its projected position. Consequently the plunger 70 is held withdrawn by the lever 68, until the bar moves forwardly far enough to carry the notch 80 into position to receive the finger 75. Thereupon, the bar is again reversed and the lever operated by the spring 83 to again lock the table.

It will be observed that the arrangement of the stops 64 and 65 with respect to the collar 62 is such that as the bar 59 moves into its rearmost position the stop 64 engaging with the collar moves the band 60 while the turntable or turret remains locked by the plunger 70; and in the forward movement of the bar, the stop 65 engages with the collar 62, after withdrawal of the plunger 70, and this movement of the collar effects the movement of the band 60 whereby to advance the turret and thus present the next blank to the cutting tool. By adjusting the stops 64 and 65 the extent of movement desired is readily obtainable.

Figure 13:
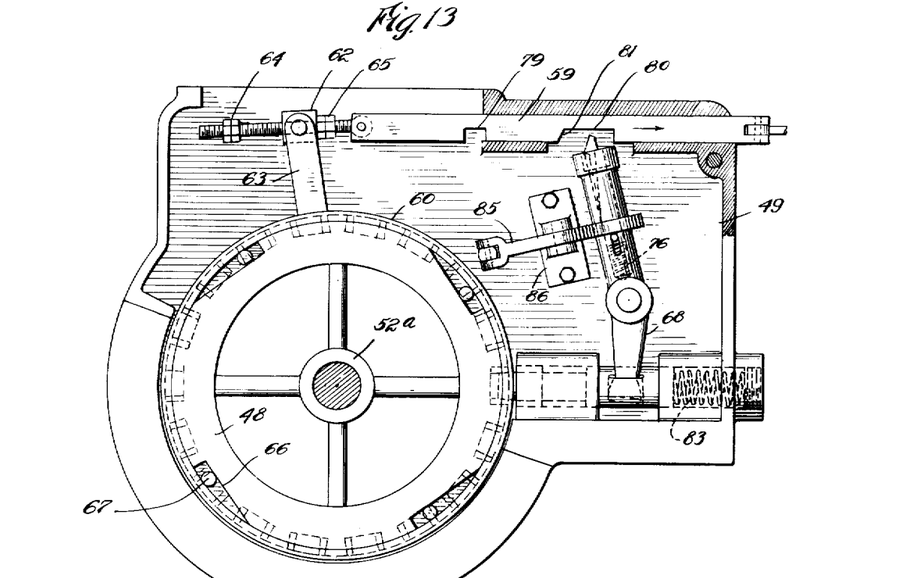
Figs. 13 and 14 are underside views of the work table, showing the table-locking and work-ejector mechanisms in different operative positions.
Figure 14:
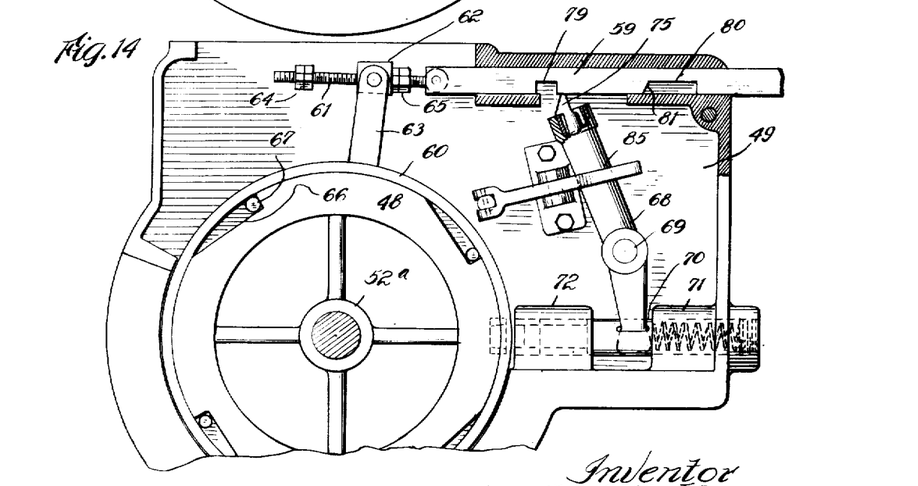

Operatively associated with the indexing mechanism is a means for ejecting the work from the turret and this means comprises a lever 85 pivoted upon the underside of the stationary table 50 in a bracket 86 (Figs. 8, 13, and 14). One end of this lever 85 is in the shape of a fork (Fig. 8) having inclined arms 87 adapted to straddle the lever 68 and constituting cams whereby the swinging movements of the lever 68 on a vertical axis serve to effect a swinging movement of the lever 85 on a horizontal axis. The opposite end of this lever 85 is pivotally connected to a plunger 88 slidable through the table 50 and adapted to enter apertures 89 provided in the plate 54 below the space between the work clamping jaws 53—53ª normally occupied by the work. As shown, the aperture 89 is of less diameter than the work so that the latter is supported over the edges of the aperture and the plunger constitutes an ejector operable to force the work from the turret as permitted by the release thereof as soon as the clamping jaws pass free of the cam 57. The arrangement is such that as the lever 68 is swung inwardly to move the plunger 70 of the indexing mechanism out of engagement with the table and thus release the table for movement, the ejector 88 is withdrawn from the aperture 89 in the table; and when the lever 68 is operated in a reverse direction to lock the table, the ejector is simultaneously operated to discharge the work which has been moved into position over the ejector.

A single means is provided for controlling the movements of the spindle on the one hand, and the operation of the indexing mechanism and associated parts on the other hand, in order that the operation of these various mechanisms may be properly synchronized and coordinated. This means comprises in the present instance a shaft 90 (Fig. 2) suitably journaled in a bearing 90ª within a casing 91 also providing bearings 91ª and 91ᵇ for the shaft 29. The casing is adapted to contain a suitable lubricant and has a cover, not shown. The shaft 90 may extend parallel to the shaft 29 rearwardly thereof, and is arranged to be connected intermittently with the shaft 29 for positive operation thereby.

This connection between the shafts 29 and 90 comprises in the present instance a pinion 92 fast upon the shaft 29 and meshing with a spur gear 93 rigid with a sleeve 94 (Fig. 12) mounted in a bearing 94ª provided in the case or housing 91. A stud shaft 95 is journalled in the sleeve 94 and in the present instance is made rigid with a drum 96 apertured at one end to receive the shaft 90 which is rigidly secured to the drum. Relative rotation between the sleeve 94 and drum 96 is thus permitted. The sleeve 94, however, is provided with an enlarged portion at its inner end constituting a head 97 annular in form and having formed in its inner face a series of teeth 98.

In the drum 96 there is formed a diametrical slot 99, near one end of which is pivoted a pin 100 constituting a dog adapted to engage with the series of teeth 98 in the head 97. A coiled compression spring 101 is entered in a socket formed at one edge of the slot 99 and acts upon the dog 100 so as normally to force it into engagement with the series of teeth 98. As shown in said Figs. 2 and 12, the teeth 98 and the dog 100 are shaped so that when the sleeve 94 with its head 97 is rotated in a counter-clockwise direction, (Fig. 4) a connection is effected between the sleeve and the drum so as to impart rotation to the latter.

Upon the drum 96 I provide cam means which in the present instance is in the form of two cams 102 and 103 between which is disposed a roller 104 upon the rear end of a lever 105. This lever is suitably supported in the bottom of the casing 91 (Fig. 3) and its forward end carries a shoe 106 engaging in a groove 107 in the sliding sleeve 108 of the clutch 33. The operation of the drum 96 serves to actuate, through the cams 102—103 and the lever 105, the clutch 33 so as to drive the spindle 18, first in one direction and then in the other; and this rotation of the drum 96 is effected intermittently under the control of the movements of the spindle, as will be presently set forth.

Figure 1:
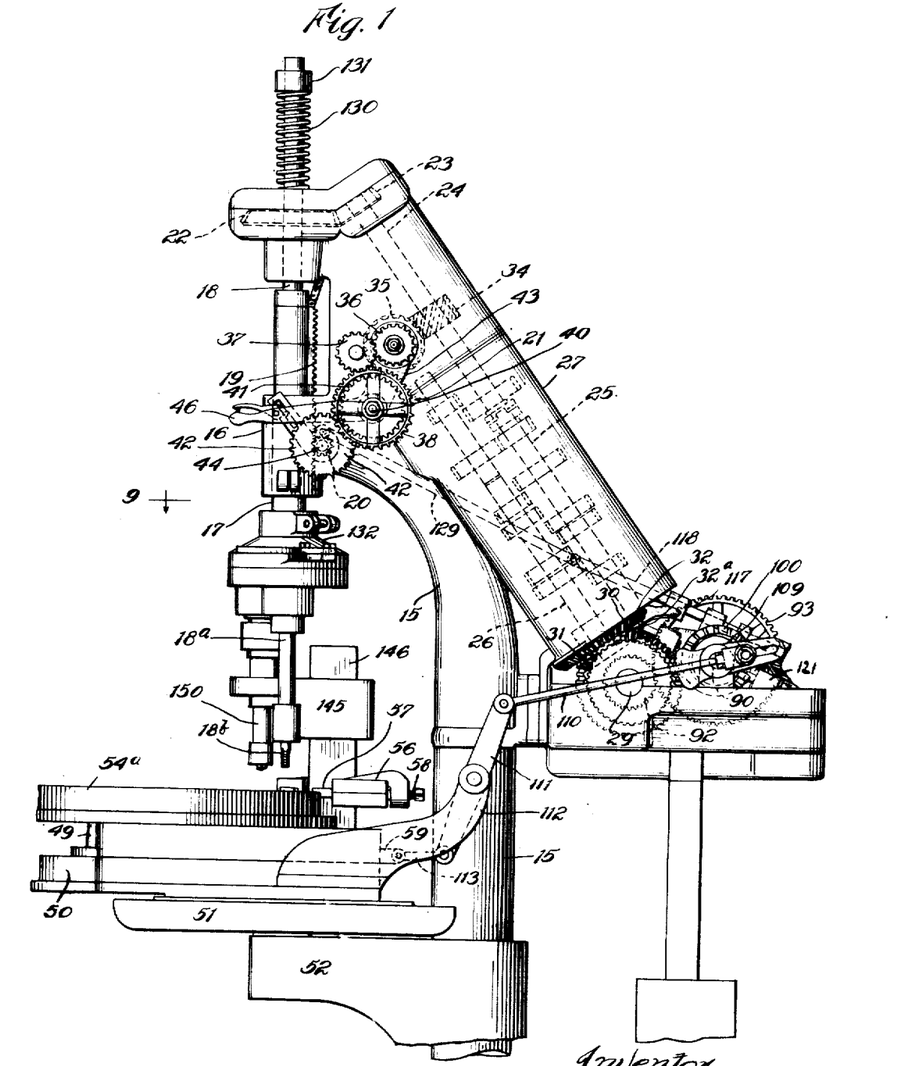
Figure 1 of the drawings is a fragmentary side elevational view of a machine in which the controlling mechanism serves to reverse the direction of rotation of the spindle at a predetermined point in the travel of the latter.

The intermittent operation of the drum 96 and hence of the shaft 90 is also utilized to effect the reciprocation of the bar 59 through the medium of a crank 109 fast upon the free end of the shaft 90 connected by a link 110 with a lever 111. The latter is pivoted between its ends upon a bracket 112 and its opposite end is connected to the bar by means of a link 113 having a pivotal connection with the rear end of the bar (Fig. 1). The arrangement is such that the bar 59 is given a full reciprocation for each revolution of the shaft. Hence the turntable is advanced one step for each rotation of the shaft just as the spindle is given a complete reciprocation for each revolution of the shaft.

The means whereby the movements of the spindle are employed to control the connection between the drum 96 with the toothed head 97 to effect the intermittent rotation of the drum, will now be described.

A pair of stop pins 114 and 115 are mounted on opposite sides of the drum 96 for movement into and out of the path of travel of the pivoted dog 100. These pins are mounted respectively on arms 116 and 117 fast upon a rod 118 which is slidable in a bracket 119 stationarily mounted on the housing 91. Preferably the bracket 119 provides a pair of arms 120 each having a bearing 121 at its free end for the pins 114 and 115. Said pins are of a length and the arrangement such that when one of the pins is withdrawn radially out of the path of travel of the pivoted dog 100, the other one of the pins is moved into such path; and the pins are preferably provided with beveled faces 122 adapted to coact with the beveled face of the dog 100 so that when the latter engages with either of the pins 114—115, the tooth is swung away from the head 97 out of engagement with the teeth 98. When this occurs the connection between the head 97 and the drum 96 will obviously be broken, and the drum will remain stationary until the connection is again established by the release of the dog 100 through the operation of the pin with which it previously engaged in the operation of effecting the disconnection.

Figure 10:
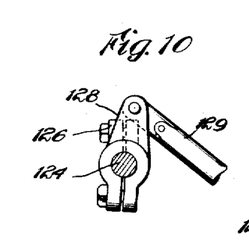
Figs. 10 and 11 are detail sectional views showing portions of the spindle-actuated trip mechanism which controls the operation of the intermittently rotating element.
Figures 11, 12:
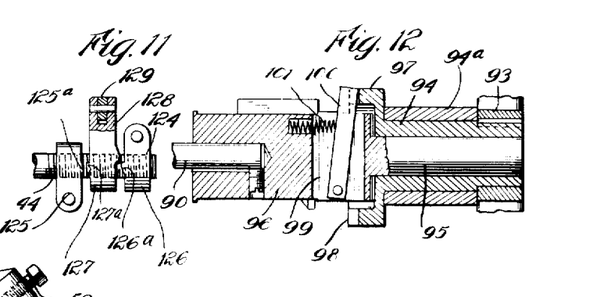
Fig. 12 is a fragmentary sectional view illustrating the connection between the rotary control element and the constantly rotating toothed element connected with the source of power.

For the purpose of reciprocating the rod 118 whereby to move the pins 114 and 115 into and out of the path of movement of the pivoted dog 100, said rod is operatively associated with the rack 19 and pinion 20 of the feed mechanism, the latter being mounted upon the cross feed spindle 44. (Figs. 1, 10 and 11.) One end of said spindle or shaft 44 is extended and screw-threaded as at 124. Upon this screw-threaded portion of the shaft I provide a pair of stops 125 and 126 which are adjustable upon the shaft, and between the stops I provide a travelling nut 127 which is formed with a radially extending arm 128 connected with the rod 118 of the control mechanism by means of a link 129. These stops 125 and 126 are so adjusted with respect to the nut 127 that when the spindle rises to its uppermost position, the nut engages with the stop 125 and when it descends to a predetermined depth, the nut engages with the stop 126. When the nut engages with either of the stops the two parts become locked together, thus oscillating the nut 127 and reciprocating the rod 118. Preferably the interengaging faces of the stops and nut are provided with projections or dogs 125ᵃ, 126ᵃ and 127ᵃ for purposes of accuracy in adjustment.

Assuming the parts to be in a position such that the spindle is descending, and with the dog 100 engaging the stop pin 115: As the spindle approaches its lowermost position, the nut 127 moves into engagement with the stop 126 fast upon the shaft 44. The nut, now turning with the shaft, actuates the link 129 and rod 118. Such movement of the rod 118 serves to move the pin 115 forwardly free from the dog 100, permitting the latter to swing under the action of its spring into interlocking engagement with the teeth 98 and thus establishing a connection between the head 97 and the drum 96. The drum 96 now rotates through 180 degrees and in this operation the cam 103 operates upon the lever 105 thus shifting the clutch 33 in a direction to effect the reversal of the spindle, namely, into engagement with the bevel gear 31 (Fig. 2) meshing with the bevel pinion 32ª on the shaft 26 (Fig. 1). These gears are so proportioned as to effect the return of the spindle at a high rate of speed. The return movement of the spindle is facilitated by the action of a coiled compression spring 130 (Fig. 1) encircling the upper end of the spindle which projects above the housing enclosing the gear 22 and bears between this gear and a collar 131 fast upon the upper end of the spindle.

As the spindle approaches its uppermost position, the nut 127 in the reverse rotation of the shaft 44, is moved in the opposite direction into engagement with the stop 125, and when the nut thus becomes locked against further rotation, it rotates with the shaft to effect the reciprocation of the rod 118, causing the latter to move downwardly or rearwardly, and carrying the pin 114 out of engagement with the dog 100. The latter is thus released for movement into engagement with the teeth 98 for rotation through another 180 degrees in which the cam 102 operates to shift the clutch into driving engagement with the gear 30 to effect a relatively slower downward feeding of the spindle.

It will be seen that each movement of the rod 118 serves not only to release one of the pins 114—115 from the pivoted dog 100 but at the same time positions the other one of said pins into the path of travel of the tooth, so that after the latter has travelled through 180 degrees the drum is brought to a stop by reason of the engagement of the tooth with the pin to effect the disconnection of the drum from the head 97. By adjusting the stops 125—126 upon the screw-threaded cross feed shaft 44, the extent of travel of the spindle may readily be varied, this being made possible by the fact that the cam drum remains idle after having travelled sufficiently to operate the clutch in either one direction or the other.

The cams 102 and 103 on the drum 96 are preferably so arranged that when the disengagement of the pivoted dog 100 from the series of teeth 98 is effected by one of the pins 114—115, the drum through its resulting disconnection from the source of power comes to a stop with the roller 104 upon the high points 102ª or 103ª of either of the cams 102 and 103. In the next movement of the drum, the roller riding off from a high point of one cam is engaged by a sharp incline 102ᵇ or 103ᵇ of the other cam whereby instantly to effect such a shifting of the lever 105 as to actuate the clutch 33 and reverse the direction of rotation of the spindle. Each movement of the drum through 180 degrees serves first to effect the disengagement of the clutch 33 and then a positive shifting thereof into driving engagement with the gear to be driven.

For the purpose of facing the upper surface of the blanks $a$ prior to the screw-threading operation, I provide a means which is operable in the reciprocation of the spindle and whose construction is such that the feeding of the facing tool to the work is stopped before the feeding of the thread-cutting tool.

Referring now to Figs. 1 and 6, the sleeve 17, in which the spindle 18 is journalled, carries near its lower end a housing 132 in which is enclosed a gear 133 fast upon the spindle and meshing with a pinion 134 on the upper end of a tubular member 135. In said member is inserted a coiled compression spring 136 acting upon the upper end of an auxiliary spindle 137 splined as at 138 to said member. A ring 139, internally flanged at its lower end, is screw-threaded upon the lower end of said member so as to hold the parts together, said auxiliary spindle having a collar 140 fast thereon with which the inturned flange of the ring engages. A space 141 is provided between the lower end of the tubular member 135 and the collar 140 to permit relative movement between these parts under the compression of the spring 136.

The housing 132 has a depending tubular projection 142 having a pair of radial bearings 143 and 144 therein which encircle the member 135 between it and said tubular projection. The lower end of the auxiliary spindle passes through a stationary bracket 145 adjustably mounted upon a post 146 (Fig. 1) rising from the stationary table 50. In the upper face of this bracket 145 is formed a recess for receiving a radial thrust bearing 148 with which a shoulder 149 formed upon the auxiliary spindle is adapted to bear to limit the downward movement of the latter. A suitable facing tool 150 is carried by the auxiliary spindle, the latter having a socket in its lower end for this purpose and also having a clamping collar 151 on the spindle provided with a radial screw 152 which is adapted to enter said socket and secure the tool shank therein.

The parts are so arranged that in the downward movement of the main spindle 18, the auxiliary spindle also moves downwardly through its connection with the sleeve 17, and the facing tool carried thereby engages with the upper face of one blank $a$ while the top or other screw-thread cutting tool engages with a preceding blank, the two tools being properly spaced apart for this purpose and two clamping means for the work being provided opposite each of the tools as shown clearly in Fig. 9. As the thread cutting tool enters the blank, the facing tool engages with the upper surface of the blank, and before the thread cutting operation is completed, the shoulder 149 engages with the radial thrust bearing 148 in the arm 145, thus stopping the downward movement of the auxiliary spindle 137, while spindle 18 and tap 18$^b$ continue downward to finish the tapping operation. That is, the housing 132 may continue to descend and with it the tubular member 135 by reason of the yielding of the spring 136. The result, it will be apparent, is that after having been fed to effect the removal of metal from the upper face to the desired depth, the feeding movement of the auxiliary spindle is cut off while the facing tool continues to operate whereby to produce a smooth, finished surface for the blank. If the feeding of the facing tool were not thus interrupted, it will be apparent that when it ceased its operation upon the blank a rough surface due to the abrupt stop would necessarily result.

In order to avoid reversely rotating the auxiliary spindle when the main spindle is reversed, I preferably make the gear 133 in two sections between which is a one-way clutch consisting of a plurality of recesses 153 and rollers 154 entered therein, the walls of the recesses being inclined as shown in Fig. 6$^a$.

Figure 2:
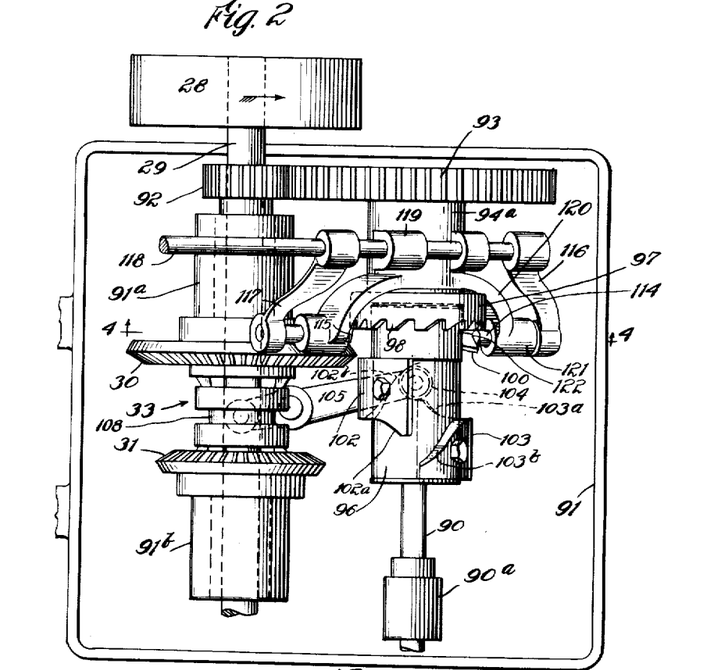
Fig. 2 is a fragmentary horizontal plan view showing the rear end of the machine and illustrating the controlling mechanism.
Figures 3, 4:
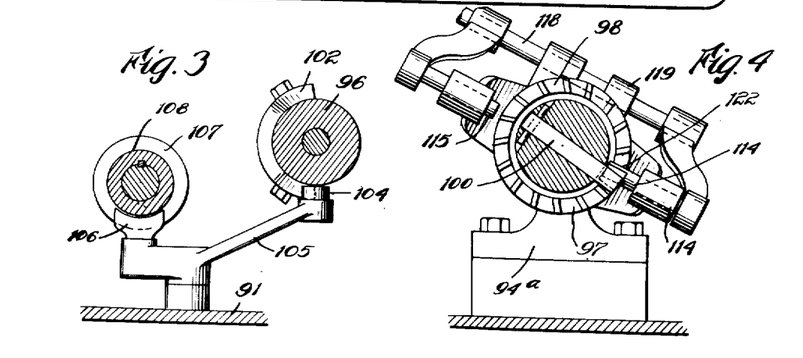
Fig. 3 is a vertical sectional view showing the connection between the intermittently rotating element and a clutch arranged to be operated thereby.
Fig. 4 is a fragmentary vertical sectional view taken substantially in the plane of line 4—4 of Fig. 2.

The operation of the machine is briefly as follows: Referring first to Fig. 2, power applied to the pulley 28 is transmitted by means of the clutch 33 to either the miter gear 30 or the bevel gear 31 to rotate the spindle 18 in one direction or the other and simultaneously effect the up or down movement of the spindle through the feed mechanism 21, (Fig. 1). As the spindle descends, the cross-feed shaft 44 is rotated counterclockwise (Figs. 1 and 10) causing the nut 127 to travel into engagement with the stop 126 and effecting the reciprocation of the rod 118 through the link 129 and arm 128 whereby to move the stop pins 114 and 115 forwardly. This effects the release of the pivot dog 100 from the stop pin 115 and at the same time disposes the pin 114 in the path of rotation of the dog 100. Upon the release of the dog 100 from the finger 115, the spring 101 forces the dog into engagement with the series of teeth 98 of the spindle rotating head 97. A connection is thus effected between the head and the drum 96, and the drum rotates through approximately one-half a revolution or until the dog 100 engages the finger 114 (the latter having been moved forwardly) effecting the disconnection of the drum from the head. In this rotation of the drum, the cam 103 operates first to shift the clutch into driving connection with the bevel gear 31 whereby to effect the instant reversal of the spindle and return it to its uppermost position at a relatively high speed.

The next movement of the drum is now effected by the approach of the spindle toward its uppermost position, in which the cross feed shaft 44 rotates to move the nut 127 into engagement with the stop 125 which moves the rod 118 rearwardly, releasing the pivot dog 100 from the finger 114 for engagement with the teeth 98. The cam drum is accordingly rotated through another half revolution until the pivot dog engages with the finger 115, disconnecting the drum from the head 97. In this half revolution of the drum, the cam 102 operated first to effect the instant shifting of the clutch 33. This effected a driving connection between the miter gear 30 and the shaft 29, resulting in the downward travel of the spindle.

In the rotation of the shaft 90 through a complete revolution a full reciprocation is imparted to the bar 59 of the mechanism for presenting the work to the cutting tools, including the indexing of the turntable and operating the ejector mechanism.

It will be observed from the foregoing detailed description of my invention that the machine tool which I have provided is capable of operating at relatively high speed and with a high degree of accuracy upon relatively small parts, with a resulting saving in both time and labor expenditure. The control mechanism is positively actuated from the driving means so that it operates with such precision as to render it possible to control the work presenting means as well as the tool spindle, maintaining them and their associate parts in perfect coordination. I also desire to point out that by reason of the positive driving of the control mechanism, the same may be connected directly with the tool spindle or other mechanism to operate them.

In a copending application Serial No. 623,632 filing date March 8, 1923, I have claimed the turn-table mechanism herein illustrated and described.

I claim as my invention:

1. An automatic machine tool having, in combination with a rotary spindle mounted for longitudinal movement, means for controlling the movements of the spindle comprising a constantly rotating toothed element, a second element operatively associated with the spindle and having a dog adapted operatively to engage with said toothed element so as to be driven thereby, and means including a pair of stop pins operable in the movements of the spindle into and out of operative association with said dog whereby to control the connection between the two elements.

2. A machine of the character described comprising, in combination, a spindle, feed mechanism for the spindle including a rotary element in driving relation thereto, power-driven means for effecting the rotation of said element including a constantly rotating driver, a member arranged for positive connection with the driver and operatively associated with said feed element, and a device operable to effect such connection of the driven member with the driver and adapted to automatically interrupt such connection upon the completion of a predetermined range of movement of the driven member by the driver.

3. In a machine tool, the combination with a member to be driven, of controlling means for said member including drive and driven elements having associated therewith a device located between and normally tending to effect a connection between the elements, and means including a stop the position of which is governed by the movements of the driven member and adapted when in one position to operate said connecting device whereby to disconnect the elements, and in another position to permit said device to effect a connection between the elements.

4. In a machine tool, the combination of a toothed head constantly rotating; a member mounted coaxially of said head and having a dog normally spring pressed into engagement with the toothed head whereby to effect an operative connection between it and said member, and means including a pair of stop pins movable into and out of the path of movement of said dog whereby to control such connection.

5. In a machine tool, the combination with a device to be driven, of control mechanism comprising a constantly rotating driving member, a second member, means operable to effect the connection and disconnection of said members, and means actuated in the movements of said device to be driven for controlling the last mentioned means including a pair of stop pins rigidly connected together so as to be movable simultaneously, the arrangement being such that in the movement of one of said stop pins out of operative association with said connecting means, the other one of said stop pins moves into operative association with the connecting means.

6. The combination of two elements one of which is constantly rotated and the other one of which has a part movable into and out of driving connection with the rotating element, a pair of stop fingers adapted for operative engagement by said part and connected together for movement in unison, one of said stop pins being moved into the path of movement of said part when the other stop pin is withdrawn from engagement with the part.

7. The combination of a drive element and a driven element, one of said elements having a series of teeth and the other one of said elements having a swingably mounted part movable into and out of engagement with said teeth, a cam member adapted to occupy a position in the path of movement of said part and operable when engaged by said part to move it out of operative association with said teeth, and means for moving said cam member out of engagement with said part to permit the latter to be restored to operative association with said teeth.

8. In combination with two coaxial elements, one of which is mounted for rotation relative to the other, means for selectively connecting said elements including a driving dog extending transversely of said elements in rotatable association therewith and normally effecting an operative driving connection between said elements and a non-rotatable cam member operable to move said dog into an inoperative position and adapted for movement relative to the dog whereby to restore the latter to its normal position.

9. The combination of a constantly rotating element, cam means mounted adjacent said element, a part to be driven, and a driving pin movable into engagement with said cam means, said cam means operating to control the operative position of said pin with respect to said constantly driven element.

10. The combination of a constantly actuated driving element, and an element to be driven, of a cam member mounted for reciprocation adjacent said elements, and a pin carried by the driven element and adapted to effect a connection between said elements, said pin being movable in the rotation of the driven element into engagement with said cam member to control its operative position with respect to the driving element, and means for moving the cam member into and out of the path of movement of said pin.

11. The combination of a pair of coaxial elements one of which is connected with a source of power to be driven thereby, a reciprocatory rod, an arm fast upon said rod and having a stop pin projecting toward one of said elements, and a part adapted to effect the connection and disconnection of said elements and arranged to be operated by said stop pin.

12. The combination of a toothed head, a drum mounted coaxially of said head and having a slot disposed substantially diametrically therein, a dog pivoted near one end of said slot, a spring in said slot and normally acting upon said dog to force it into driving association with said teeth, and cam means for moving said dog out of operative association with said teeth.

13. The combination of a longitudinally movable spindle, feed mechanism for the spindle including a cross shaft having a gearing connection therewith, a constantly rotating driving element, means arranged to be driven by said driving element for controlling the movements of said spindle and including a second element operatively associated with the spindle, and means for connecting and disconnecting said second element to and from the first element including a reciprocatory member, a nut on said cross shaft connected with said member, and a pair of stops adjustably mounted on said shaft for engagement by said nut as the shaft rotates in opposite directions.

14. The combination in a machine tool of a shaft rotating alternately in opposite directions and having a pair of stops thereon, a travelling nut screw-threaded on the shaft between said stops, a rod connected with said nut so as to be movable thereby, a driving element and a driven element, and means controlled by the movement of said rod for effecting a positive driving connection between said elements.

15. The combination in a machine tool of a shaft rotating alternately in opposite directions and having a pair of stops thereon, a travelling nut screw-threaded on the shaft between said stops, a rod connected with said nut so as to be movable thereby, a drive element and a driven element, and means controlled by the movements of said rod for effecting the connection and disconnection of the driven element to and from the driving element.

16. The combination with a longitudinally movable spindle, feeding mechanism including a cross shaft having a gearing connection with the spindle, and means for controlling the movements of the spindle including a reciprocatory member, means operable in the reciprocation of said member to effect the rotation of said shaft in one direction or the other, a nut threaded on said shaft and connected with said member, and a pair of stops on the shaft adapted for engagement by said nut.

17. In a machine tool, the combination of a spindle, a drive shaft, means for connecting the drive shaft with the spindle to rotate it alternately in opposite directions and including a clutch, a constantly driven member, a drum having cam means thereon, an element connected with said clutch and extending into the path of said cam means operable in the rotation of the drum to actuate said clutch, and means controlled by the movements of the spindle for effecting the positive connection of said drum with said member.

18. In a machine tool, the combination of a drive shaft and a driven shaft, means for connecting the driven shaft with the drive shaft for rotation alternately in opposite directions and including a clutch, a constantly rotating member, a second member having a pair of cams thereon operable successively to operate said clutch whereby to actuate the driven shaft first in one direction and then in the other, and means controlled by the movements of the spindle for positively connecting said element with the driven member for intermittent rotation thereby, the arrangement being such that said cam members operate successively in the intermittent operations of said element.

19. The combination of two axially alined elements, one of which is connected with a source of power, means normally tending to effect a driving connection between said elements, and means operable at spaced points in a single revolution of the driven element to alternately connect and disconnect it from the drive element.

20. A machine tool having a spindle mounted for rotational and longitudinal movements, a work table also mounted for rotational movement, a feed mechanism for moving the spindle longitudinally, means for reversely rotating the spindle, means for rotating the table, and means operable in the operation of the feed mechanism for controlling the direction of rotation of the spindle and the rotation of said table.

21. The combination in a machine tool of a spindle mounted for reciprocation, a constantly rotated member, cam means operatively associated with the spindle, and means controlled by the movements of the spindle for intermittently but positively actuating said cam means from said driven member, said cam means including a pair of cams operable successively to effect a change in the movement of the spindle.

22. The combination in a machine tool, of a reciprocable spindle, a drive shaft, means for rotating the spindle alternately in opposite directions and at different speeds from said drive shaft including a clutch, a constantly rotating member, means for actuating said clutch including an element having a pair of cams thereon operable respectively to effect the rotation of the spindle in one direction or the other, and means controlled by the movements of the spindle for positively connecting said element with said driven member for intermittent rotation thereby whereby to actuate said cams successively.

23. The combination in a machine tool of a reciprocable spindle, a drive shaft, means for rotating the spindle alternately in opposite directions and at different speeds from said drive shaft including a clutch, a constantly rotating member, means for actuating said clutch including an element having a pair of cams thereon operable respectively to effect the rotation of the spindle in one direction or the other, and means controlled by the movements of the spindle for positively connecting said element with said driven member for intermittent rotation thereby, the arrangement being such that the rotary element moves through approximately a half revolution to operate the clutch in one direction or the other.

24. An automatic tapping machine comprising a reciprocatory spindle, a drive shaft, means for connecting said shaft with the spindle to rotate it alternately in opposite directions and including a driven shaft and a clutch, feed mechanism operatively associated with said shaft to effect the reciprocation of the spindle, a constantly rotating member, and means controlled by the movements of the spindle for operating said clutch and including a cam operated intermittently but positively by said constantly rotating member, and a clutch lever operatively associated with said cam.

25. An automatic tapping machine comprising, in combination with a reciprocatory spindle, a drive shaft, means for rotating said shaft in opposite directions and including a clutch, feed mechanism operatively associated with the last mentioned means for effecting the reciprocation of the spindle, a constantly rotating member, and means for actuating said clutch including a second member arranged to be driven by said first member, a connecting dog for said members and rotatable therewith when the members are connected, and means controlled by the movements of the spindle to effect the reversal thereof by said clutch including a part movable in the movements of the spindle into and out of the path of travel of said dog and adapted to operate the latter.

26. In a machine tool, the combination with a reciprocatory spindle and a turntable operable intermittently to present work beneath the spindle, of means for controlling the movements of the spindle and said table including a constantly rotating element, a second element, and means governed by the movements of the spindle for intermittently effecting a positive driving connection between said elements.

27. In a machine tool, the combination with a reciprocatory spindle and a turntable operable intermittently to present work beneath the spindle, of means for controlling the movements of the spindle and said table including a constantly rotating element, a second element, and means governed by the movements of the spindle to effect the intermittent operation of said second element by the first element approximately through a half revolution.

28. The combination of a reciprocable spindle, a work table adapted for intermittent rotation to position work relative to a cutting tool carried by the spindle, a constantly driven member, a rotary element operatively associated with said spindle and having a connection with said table, and means controlled by the movements of the spindle for effecting the intermittent rotation of said element approximately through a half revolution, the connection between said element and said table including an operating member movable alternately in opposite directions in the successive operations of said element.

29. A machine tool having a spindle mounted for longitudinal and rotational movements, means for rotating the spindle, feed mechanism for the spindle operatively associated with the last mentioned means so as to be driven thereby, and means for controlling the movements of the spindle comprising a constantly driven element, a second element operatively associated with the feed mechanism, and means operating in the operation of the feed mechanism to effect a positive driving connection between said elements.

30. A machine tool having a spindle mounted for longitudinal and rotational movements, means for rotating the spindle in opposite directions including a clutch, feed mechanism for moving the spindle longitudinally and operatively associated with the last mentioned means so as to be driven thereby, and means for operating said clutch connected with said feed mechanism so as to be actuated thereby, the last mentioned means comprising a constantly driven element, a second element operatively associated with the clutch, and means operating in the operation of the feed mechanism to effect a positive driving connection between said elements.

31. A machine tool having a spindle mounted for reciprocatory and rotational movements, driving means connected with the spindle to rotate it, feed mechanism connected with the driving means to move the spindle longitudinally, means for controlling the operation of the driving means comprising a clutch operatively associated therewith, cam means for operating the clutch, and means controlled by the longitudinal movements of the spindle for actuating said cam means.

32. A machine tool having a spindle mounted for reciprocatory and rotational movements, driving means connected with the spindle to rotate it, feed mechanism connected with the driving means to move the spindle longitudinally, means for controlling the operation of the driving means comprising a clutch operatively associated with the driving means, means for operating the clutch, and means controlled by the longitudinal movements of the spindle for actuating said clutch-operating means, the last mentioned means comprising a constantly rotating element, a second element connected with the clutch-operating means to operate it, and a device operable to connect and disconnect said elements arranged to be actuated in the operation of the feed mechanism the arrangement being such that as the spindle approaches either end of its longitudinal movement the device is actuated to connect said elements.

33. A machine tool having a spindle control mechanism comprising a constantly rotating element, a second element operatively associated with the spindle, a member adapted to connect said elements, said member being pivotally connected to one of said elements in driving relation thereto and means controlled by the movements of the spindle to actuate said member whereby to control the connection between said elements.

34. In a machine tool, a spindle control mechanism comprising a constantly rotating drive element, cam means arranged to be driven by said element and operatively associated with the spindle, and means for periodically interrupting the movement of said cam means by said drive element comprising a drive member and a pair of stop members alternately movable into the path of movement of said drive member to render it inoperative.

35. A control mechanism comprising, in combination with a reciprocatory part, a constantly rotating drive element, a second element to be driven intermittently, and means providing an intermittent connection between said elements including a drive member and a pair of stop members alternately movable in the movements of said part into the path of movement of said drive member to operate it.

36. A machine of the character described comprising, in combination, a rotary element to be driven, power driven means for effecting the rotation of said element including a constantly rotating driver, a member arranged for positive connection with the driver and operatively associated with said element, and a device operable to effect such connection of the driven member with the driver and adapted to automatically interrupt such connection upon the completion of a predetermined range of movement of the driven member by the driver.

37. The combination of a drive element and a driven element, a member mounted on one of said elements and extending transversely thereof for movement into and out of association with the other element to form a driving connection therewith, means for controlling the position of said member including a stop with which said member is adapted to engage, said stop serving upon being engaged by the member to interrupt the driving connection between said two elements, and means for reciprocating said stop into and out of the path of movement of said member.

38. A machine tool having, in combination, a longitudinally reciprocable tool spindle, a shaft operatively associated with said spindle so as to rotate in the movements of the spindle, a drive element, a driven element, means providing a disengageable connection between said elements, and means for controlling such connection including a stop on said shaft, a member screw threaded on the shaft and arranged to travel thereon in the rotation of the shaft into and out of engagement with said stop, said member being operatively associated with said controlling means whereby to operate the same upon the engagement of the member with the stop.

In testimony whereof, I have hereunto affixed my signature.
ALBERT M. JOHNSON.

CERTIFICATE OF CORRECTION.

Patent No. 1,679,529.  Granted August 7, 1928, to

ALBERT M. JOHNSON.

It is hereby certified that error appears in the printed specification of the above numbered patent requiring correction as follows: Page 5, line 129, for the word "top" read "tap"; page 9, line 46, claim 26, after the word "element" insert the words "operatively associated with the spindle and the turn table"; same page, line 56, claim 27, after the word "element" insert the words "operatively associated with the spindle and the table"; and that the said Letters Patent should be read with these corrections therein that the same may conform to the record of the case in the Patent Office.

Signed and sealed this 25th day of September, A. D. 1928.

M. J. Moore,
Acting Commissioner of Patents.

(Seal)

with the clutch-operating means to operate it, and a device operable to connect and disconnect said elements arranged to be actuated in the operation of the feed mechanism the arrangement being such that as the spindle approaches either end of its longitudinal movement the device is actuated to connect said elements.

33. A machine tool having a spindle control mechanism comprising a constantly rotating element, a second element operatively associated with the spindle, a member adapted to connect said elements, said member being pivotally connected to one of said elements in driving relation thereto and means controlled by the movements of the spindle to actuate said member whereby to control the connection between said elements.

34. In a machine tool, a spindle control mechanism comprising a constantly rotating drive element, cam means arranged to be driven by said element and operatively associated with the spindle, and means for periodically interrupting the movement of said cam means by said drive element comprising a drive member and a pair of stop members alternately movable into the path of movement of said drive member to render it inoperative.

35. A control mechanism comprising, in combination with a reciprocatory part, a constantly rotating drive element, a second element to be driven intermittently, and means providing an intermittent connection between said elements including a drive member and a pair of stop members alternately movable in the movements of said part into the path of movement of said drive member to operate it.

36. A machine of the character described comprising, in combination, a rotary element to be driven, power driven means for effecting the rotation of said element including a constantly rotating driver, a member arranged for positive connection with the driver and operatively associated with said element, and a device operable to effect such connection of the driven member with the driver and adapted to automatically interrupt such connection upon the completion of a predetermined range of movement of the driven member by the driver.

37. The combination of a drive element and a driven element, a member mounted on one of said elements and extending transversely thereof for movement into and out of association with the other element to form a driving connection therewith, means for controlling the position of said member including a stop with which said member is adapted to engage, said stop serving upon being engaged by the member to interrupt the driving connection between said two elements, and means for reciprocating said stop into and out of the path of movement of said member.

38. A machine tool having, in combination, a longitudinally reciprocable tool spindle, a shaft operatively associated with said spindle so as to rotate in the movements of the spindle, a drive element, a driven element, means providing a disengageable connection between said elements, and means for controlling such connection including a stop on said shaft, a member screw threaded on the shaft and arranged to travel thereon in the rotation of the shaft into and out of engagement with said stop, said member being operatively associated with said controlling means whereby to operate the same upon the engagement of the member with the stop.

In testimony whereof, I have hereunto affixed my signature.

ALBERT M. JOHNSON.

CERTIFICATE OF CORRECTION.

Patent No. 1,679,529.     Granted August 7, 1928, to

ALBERT M. JOHNSON.

It is hereby certified that error appears in the printed specification of the above numbered patent requiring correction as follows: Page 5, line 129, for the word "top" read "tap"; page 9, line 46, claim 26, after the word "element" insert the words "operatively associated with the spindle and the turn table"; same page, line 56, claim 27, after the word "element" insert the words "operatively associated with the spindle and the table"; and that the said Letters Patent should be read with these corrections therein that the same may conform to the record of the case in the Patent Office.

Signed and sealed this 25th day of September, A. D. 1928.

(Seal)

M. J. Moore,
Acting Commissioner of Patents.